(12) United States Patent
Carru et al.

(10) Patent No.: US 11,973,748 B1
(45) Date of Patent: Apr. 30, 2024

(54) TOKEN-BASED SECURE DATABASE QUERY RESULT SHARING

(71) Applicant: Snowflake Inc., Bozeman, MT (US)

(72) Inventors: Damien Carru, New York, NY (US); Thierry Cruanes, San Mateo, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/497,232

(22) Filed: Oct. 30, 2023

(51) Int. Cl.
*H04L 9/40* (2022.01)

(52) U.S. Cl.
CPC .................. *H04L 63/0807* (2013.01)

(58) Field of Classification Search
CPC .................................................. H04L 63/0807
See application file for complete search history.

(56) References Cited

U.S. PATENT DOCUMENTS

| | | | |
|---|---|---|---|
| 8,321,460 B2 * | 11/2012 | Munday | G06F 21/6227 707/783 |
| 10,664,319 B1 * | 5/2020 | Kaplan | G06F 21/6218 |
| 10,986,117 B1 * | 4/2021 | Agbabian | G06F 21/6218 |
| 10,999,355 B1 * | 5/2021 | Chu | G06F 16/2379 |
| 11,010,392 B1 * | 5/2021 | Hirsch | G06F 16/2471 |
| 11,062,042 B1 * | 7/2021 | McKervey | H04L 63/123 |
| 11,270,020 B1 * | 3/2022 | Carru | H04L 63/105 |
| 11,392,578 B1 * | 7/2022 | James | G06F 16/24573 |
| 2018/0196955 A1 * | 7/2018 | Dageville | G06F 21/6218 |

* cited by examiner

*Primary Examiner* — Darren B Schwartz
(74) *Attorney, Agent, or Firm* — Schwegman Lundberg & Woessner, P.A.

(57) ABSTRACT

Techniques for sharing query results in a multi-tenant database system are described. The query results can be shared between users of the same account or organization in the multi-tenant network-based database system using security tokens. A first user executes a query, and the results are stored in the network-based database system. The first user can invoke a function to create a security token to provide access to the stored query results to other users in the same account. The first user can share the security token with the other users, who can directly access the stored results in the network-based database system instead of having to download local copies of the query results.

15 Claims, 7 Drawing Sheets

US 11,973,748 B1

TOKEN-BASED SECURE DATABASE QUERY RESULT SHARING

TECHNICAL FIELD

The present disclosure generally relates databases and more particularly to sharing query results in database systems using security tokens.

BACKGROUND

As the world becomes more data driven, database systems and other data systems are storing more and more data. Databases are widely used for data storage and access in computing applications. Using queries is one technique for analyzing data stored in a database system. Users oftentimes will want to share data from query results with other users.

One approach to sharing data is requiring users to re-run queries. Thus, a user can share the query syntax, but the query is re-run for each shared user. However, executing queries can be expensive and time consuming, so this approach involving re-running queries is not efficient. Another approach involves downloading local copies of the query results and sending the downloaded local copies to other users. This approach is not secure and cumbersome because the local copies of the files can be very large.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for sharing query results in a multi-tenant network-based database system. The query results can be shared between users of the same account or organization in the multi-tenant network-based database system using security tokens. A first user executes a query, and the results are stored in the network-based database system. The first user can invoke a function to create a security token to provide access to the stored query results to other users in the same account. The first user can share the security token with the other users, who can directly access the stored results in the network-based database system instead of having to download local copies of the query results. Therefore, the lifecycle of sharing the query results can be managed within the network-based database system.

The security token techniques described herein provide technical advantages such as improving security, flexibility, and efficiency, among others. The owner/creator of the security token can manage the lifecycle of the security token and therefore access to the query results within the network-based database system. The query results are stored and maintained separately from the security token in the network-based database system, providing security and conserving storage resources.

Figure 1:
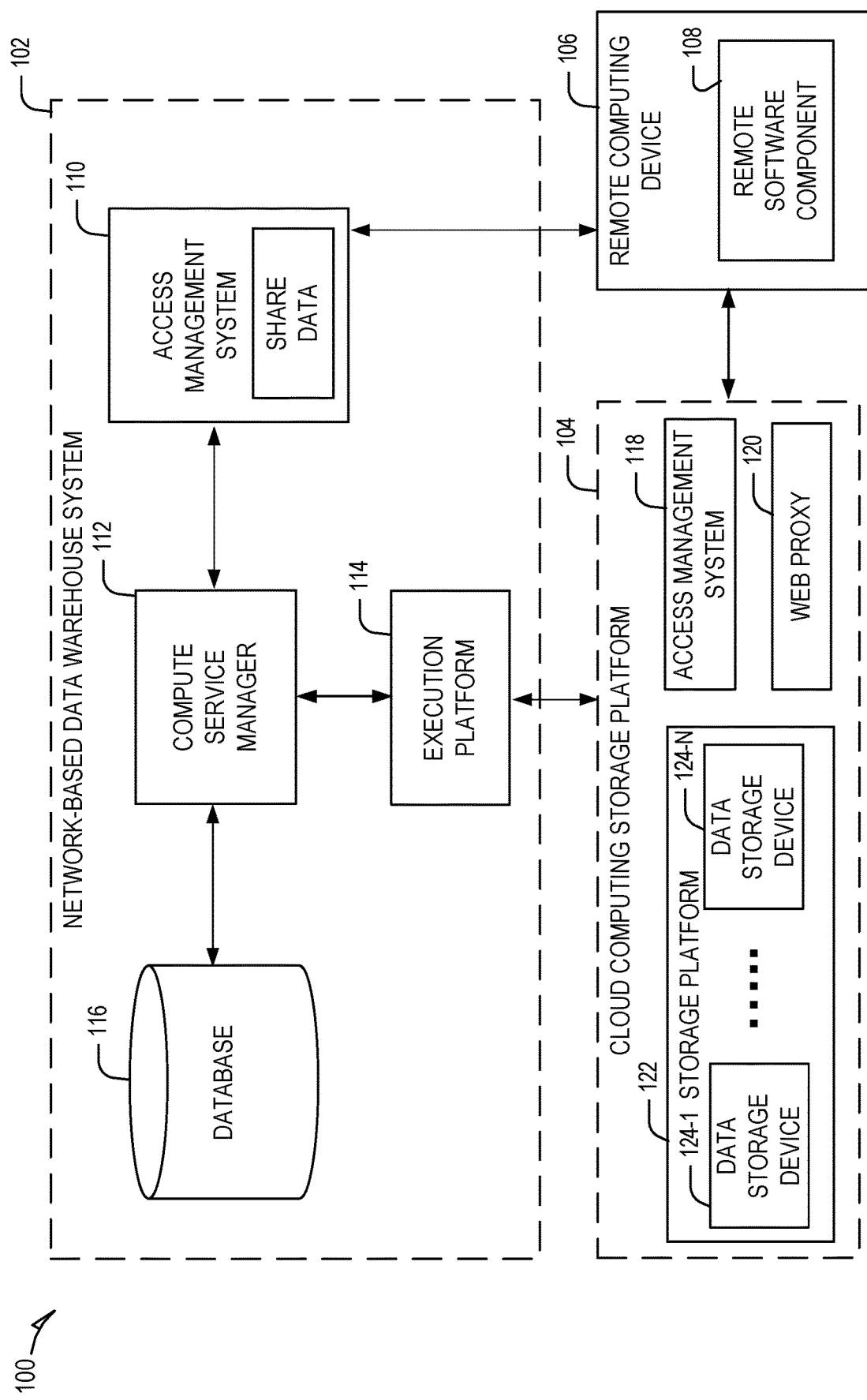
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below. For example, the compute service manager 112 can generate and maintain security tokens to share query results with other users, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
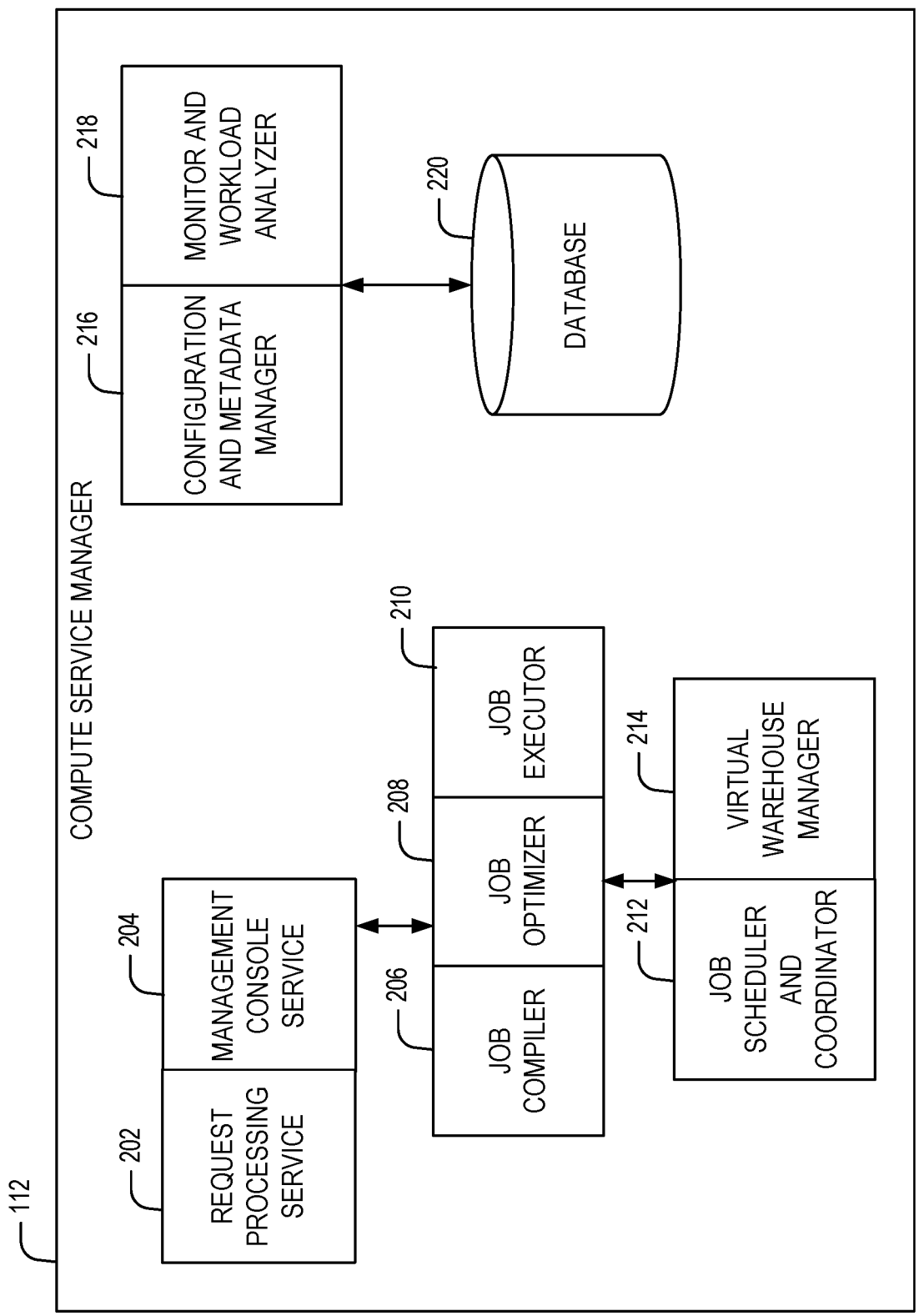
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
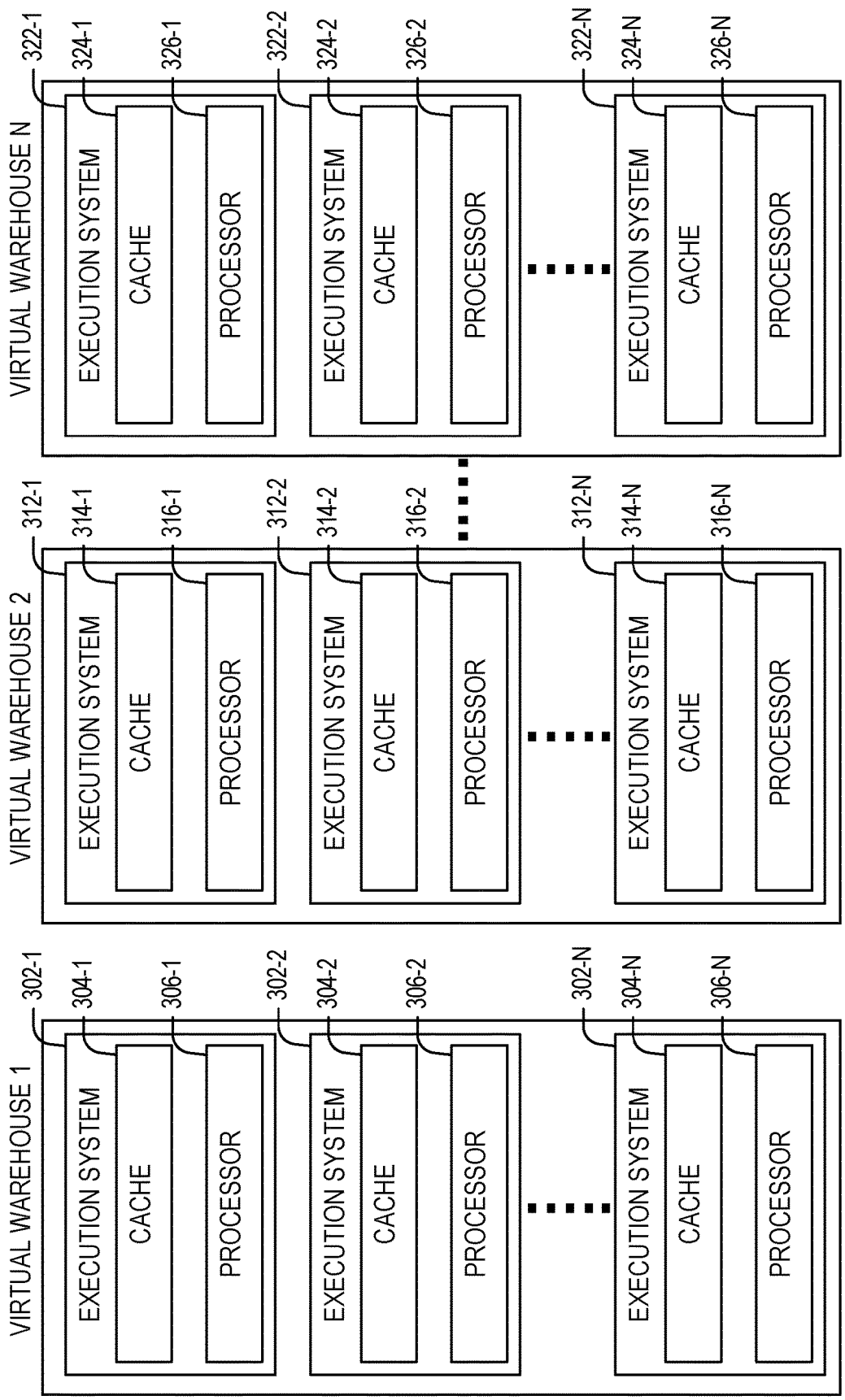
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Sharing query results allows different users to access previously run query results instead of re-running queries. In some conventional systems, users could share query results by downloading copies of the query results (e.g., csv files) locally and then sending those local copies to other users. Using this local-copying technique, users could not manage the results after sharing and could lose control of the results. Results shared through the local-copying technique are not secured by the underlying database, could be easily modified or tampered with, and there is no way for the owner of the result to gain knowledge of further access to the result data from third parties. Also, the management of the lifecycle of the shared results would occur outside of the database system (e.g., network-based database system 102).

Next, techniques for sharing query results using security tokens within a network-based database system will be described. A user may execute a query, and the results may be stored within the network-based database system (e.g., network-based database system 102). The user can invoke a function to create a security token to provide access to the stored results. The user can share the token directly with another user, who can directly access the stored results in the network-based database system instead of downloading entire results. Therefore, the lifecycle of sharing the results can be managed within the network-based database system.

Figure 4:
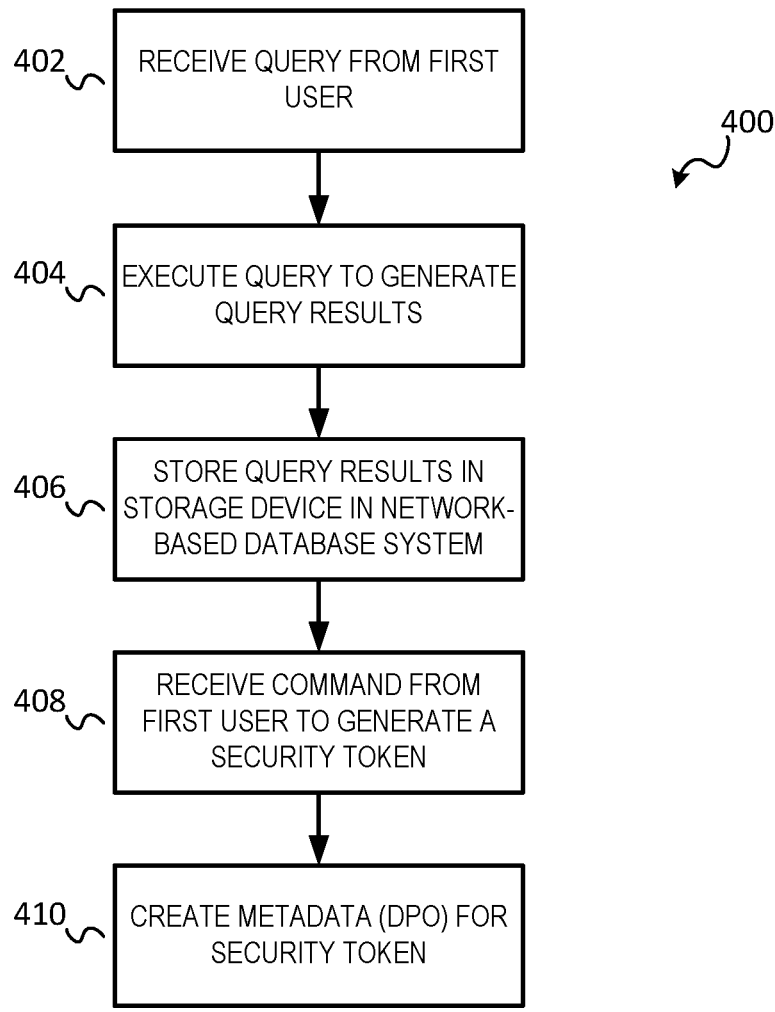
FIG. 4 illustrates a diagram for a method for sharing query results within a network-based database system, according to some example embodiments.

FIG. 4 illustrates a diagram for a method 400 for sharing query results within a network-based database system, according to some example embodiments. At operation 402, a query may be received from a first user associated with a first account within a network-based database system (e.g., network-based database system 102). At operation 404, the query is executed by the network-based database system. The query may be processed by a compute service manager (e.g., compute service manager 112, where it can be compiled. A query plan may be generated to execute the query. One or more jobs associated with the query plan may be assigned to one or more execution platforms (e.g., execution platform 114). The one or more execution platforms may execute the one or more jobs to generate results for the query.

At operation 406, the query results are stored in one or more storage devices (e.g., storage devices 124-1 to 124-N)

of the network-based database system, as described herein. The query results may be stored with a job ID and query ID associated with the query results. The query results may also be transmitted to the first user.

At operation 408, a command to generate a security token for the query results is received from the first user. For example, the first user may invoke a command (e.g., SELECT SHARED_RESULT_CREATE_TOKEN (<query_id>)).

In response the network-based database system may generate a security token associated with the query results. The security token may include a unique string value.

In some embodiments, the syntax for generating a token can include:
SHARED_RESULT_CREATE_TOKEN (
  {'<query_id>' $query_id},
  [<expiration in days>])
'<query_id>' $query_id may be a string value representing the query id. In some embodiments, it could be a scalar expression containing the query id, including session variable, bind variables, or expressions, such as the LAST_QUERY_ID( ) function which returns the ID of a query within the current session.
<expiration in days> may be a number value representing the number of days after which to expire the token.

At operation 410, metadata, such as a data persistent object (DPO), is created for the security token and stored in a metadata database. The metadata for the security token may be stored separately from the stored query results. The metadata may be used to manage the lifecycle of the security token, separately from the stored query results.

Figure 5:
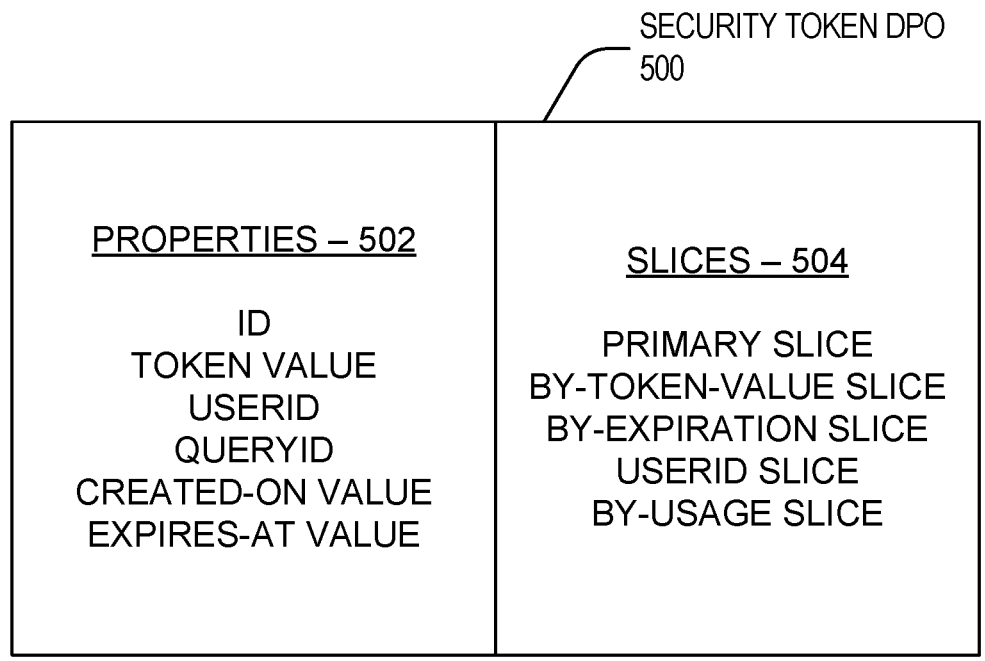
FIG. 5 illustrates a security token data persistent object, according to some example embodiments.

FIG. 5 illustrates a security token DPO 500, according to some example embodiments. The security token DPO 500 may include properties 502 and slices 504.

The properties 502 may include an ID value. The properties 502 may include a token value, which may be the unique string value. The string value may include a random string value used by users of the network-based database system to reference the token. The properties 502 may include a user ID, which may be a number value associated with the user who created the token. The properties 502 may include a query ID, which may be a number value (e.g., JobId) associated with the job referenced by the token. The properties 502 may include a created-on value, which may be a number value of a time at which the token was created. The properties 502 may include an expires-at value, which may be a number value representing a time at which the token is set to expire.

The slices 504 may include a primary slice, which may include keys (e.g., ID) with values, such as TokenValue, UserId, QueryId, CreatedOn, and ExpiresAt. The slices 504 may include a ByTokenValue slice, which may include keys, such as AccountID, TokenValue, and values, such as ID. The slices 504 may include a ByExpiration slice, which may include keys, such as ExpiresAt, AccontId, ID. The slices may include a UserId slice, which may include keys, such as AcountId, UserId, ID. The slices 504 may include a ByUsage slice, which may include keys, such as AcountID, TokenValue, UserId, AcessTime, QueryId.

The slices 504 may be used to perform various lifecycle and auditing operations. For example, a background service may use the ByExpiration slice to delete the tokens that have expired. As another example, the ByUserId slice may be used to retrieve all tokens created by a certain user. As another example, the ByUsage slice may be used to collect auditing information for which users have used the tokens to access stored query results, as described in further detail below.

The security tokens may be shared with other users in the network-based database system, who can then access the associated query results without additional privilege checks. The network-based database system may authenticate that the user trying to access the query results via the security token belongs to the same account or organization as the user who created the token, and may then provide access to the stored query results without performing additional privilege checks. Moreover, the use of the security tokens may allow sharing query results independent of a particular role of the users.

Figure 6:
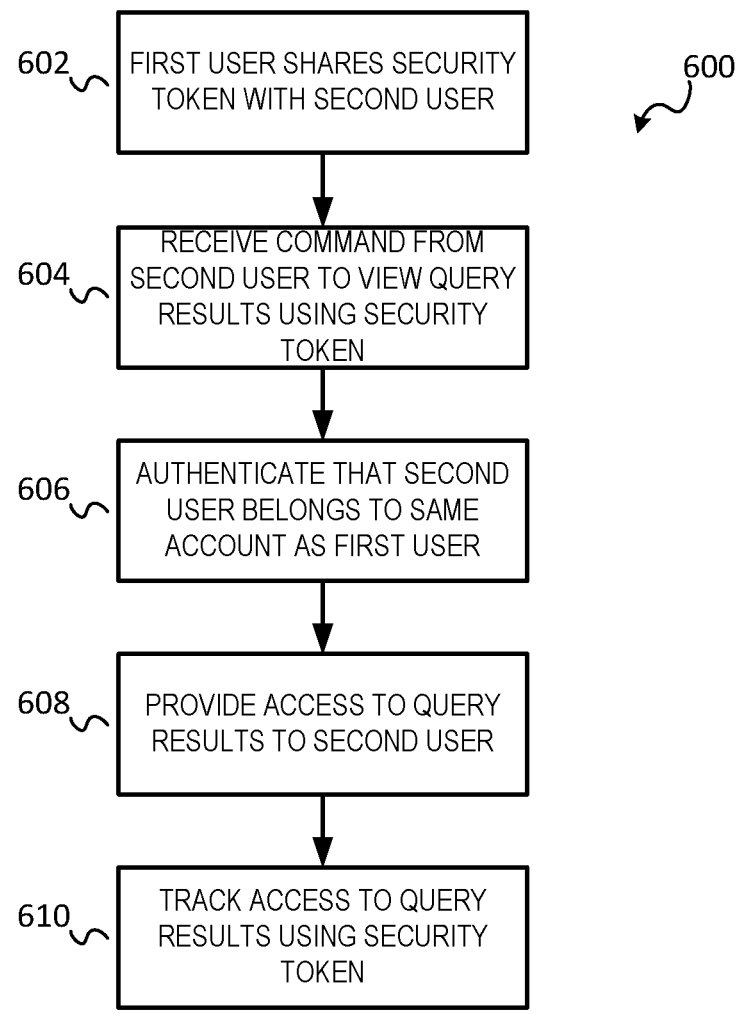
FIG. 6 illustrates a flow diagram for a method for receiving access to stored query results using a security token, according to some example embodiments.

FIG. 6 illustrates a flow diagram for a method 600 for receiving access to stored query results using a security token, according to some example embodiments. At operation 602, a first user, which created a security token associated with stored query results (see, e.g., method 400 of FIG. 4), shares the security token with a second user of the network-based database system. For example, the first user may share the toke value (e.g., string value) with the second user.

At operation 604, a command or request to view the stored query results using the security token is received from the second user. For example, the second user may invoke a command (e.g., SELECT*FROM TABLE
(SHARED_RESULT_SCAN ('TOKEN VALUE'))).

At operation 606, the network-based database system authenticates that the second user belongs to the same account as the first user, who created the security token. The account information of the first user who created the security token is stored in the security token DPO, as described above. The account information of the second user is retrieved by the network-based database warehouse based on its current login session.

At operation 608, access to query results stored in the network-based database system is provided to the second user. Instead of receiving a local copy of the query results, the second user is given access to the stored query results in the storage devices of the network-based database system. The second user is restricted from having visibility into the first user and the source table used to generate the query results. The second user can be restricted to accessing only the query results.

At operation 610, access to the query results is tracked based on usage of the security token. Audit information tracks who and how the query results were accessed may be stored with the security token DPO. For example, the number of accesses provided by a given token may be tracked. The tracked information can include username, access time, and query_id of the accessing queries. For example, the tracked information can include a set of rows where each row can include the username of the user invoking the security token, the time of invocation, and queryID.

As mentioned above, the use of the security token DPO can be used to manage the lifecycle of the security token, which is separate from the lifecycle of the stored query results associated with the security token. For example, the slices in the security token DPO can be used to retrieve a list of tokens (e.g., all non-expired tokens) created by a certain user. The list may include expiration dates of the security tokens. The queryID and query text can also be returned to the user that created the token; the queryID and query text may be hidden from other users.

The user who created the security token can adjust the expiration date. For example, the user who created the security token can extend the expiration date or make the expiration shorter. The user who created the security token can also invalidate the security token. An expired/invalidated security token affects the security token and not the query results associated with the expired/invalidated security token. The lifecycle of the query results is maintained separately.

The use of security tokens as described herein allow the workflow of sharing query results to be managed inside the network-based database system. The security token techniques provide technical advantages such as security. The owner/creator of the security token can manage the lifecycle of the security token by denying access and invalidating the token to prevent further access, which can result in better security. The other users who are provided access to the security token are authenticated by the network-based database system providing another layer of security. The query results are stored and maintained in the network-based database system, providing security for the query results.

The security token techniques also provide better auditability. By managing access to query results internally in the network-based database system, access history to the query results can be compiled and audited. The security token techniques also improve the speed and cost of sharing query results as compared to sharing of downloaded local copies, which can be large files. The security token guarantees the immutability of the query results and makes sure the results cannot be tampered with. The security tokens also improve user experience by providing a streamlined approach to sharing query results.

Figure 7:
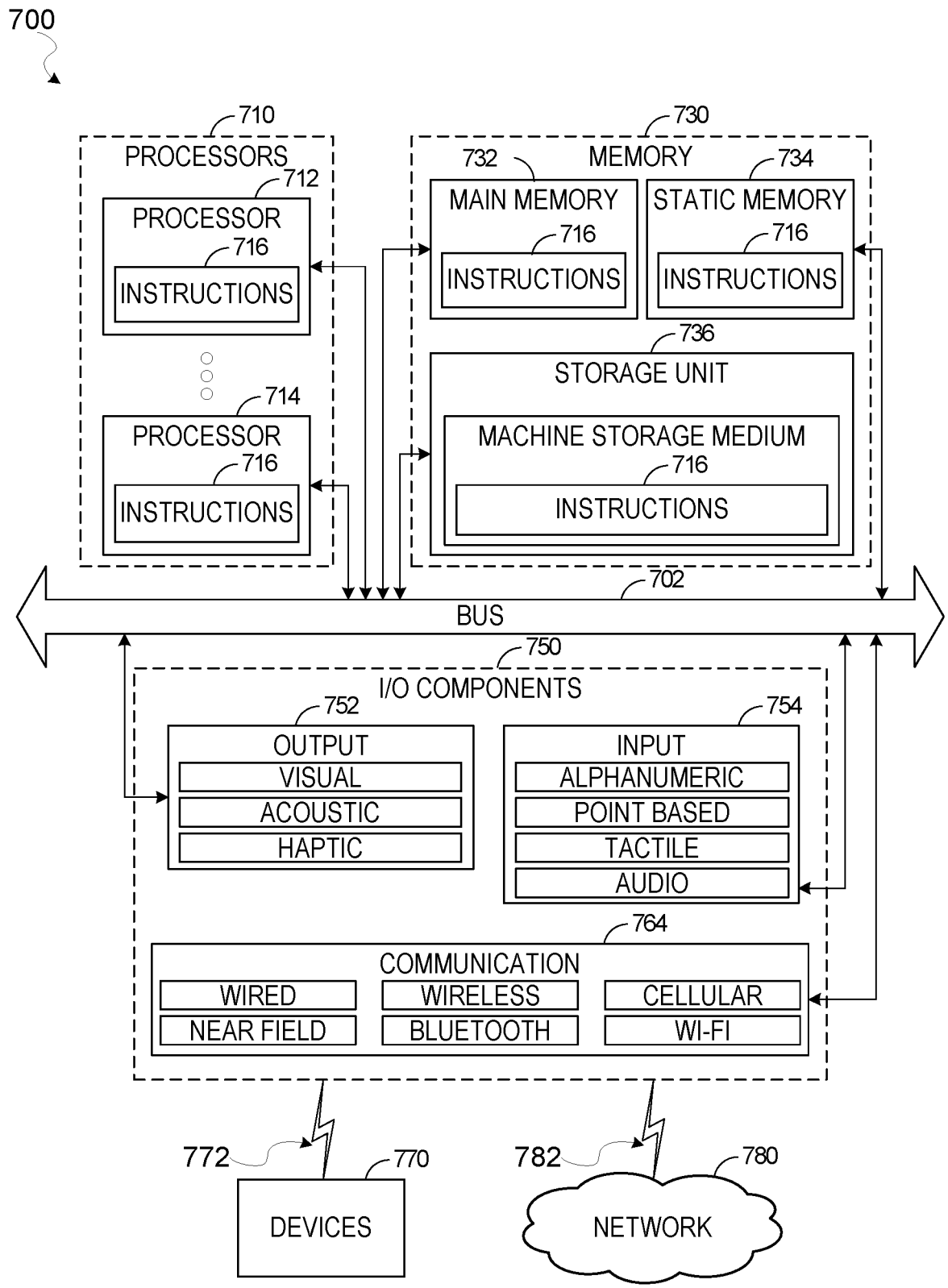
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described herein. As another example, the instructions 716 may cause the machine 700 to implement portions of the data flows described herein. In this way, the instructions 716 transform a general, non-programmed machine into a particular machine 700 (e.g., the remote computing device 106, the access management system 118, the compute service manager 112, the execution platform 114, the access management system 110, the Web proxy 120) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the remote computing device 106, the access management system 118, the compute service manager 112, the execution platform 114, the access management system 110, the Web proxy 120, and the devices 770 may include any other of these systems and devices.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving, from a first user associated with an account in a multi-tenant database system, a query; executing, by at least one hardware processor in the multi-tenant database system, the query to generate query results; storing the query results in at least one storage device in the multi-tenant database system; generating a security token associated with the stored query results, the security token including a unique string value; sharing the security token with a second user; and providing access to the stored query results in the at least one storage device to the second user based on the security token.

Example 2. The method of example 1, further comprising: receiving, from the second user, a request to access the stored query results, the request including the security token; and authenticating the second user as belonging to the account in the multi-tenant database system.

Example 3. The method of any of examples 1-2, wherein metadata associated with the security token is stored in a metadata database separate from the stored query results.

Example 4. The method of any of examples 1-3, wherein the metadata includes a data persistent object including properties and slices.

Example 5. The method of any of examples 1-4, wherein lifecycle of the security token is managed separately from the lifecycle of the stored query results.

Example 6. The method of any of examples 1-5, further comprising: tracking access to the stored query results based on usage of the security token to generate tracking information.

Example 7. The method of any of examples 1-6, further comprising: generating audit information of access to the stored query results based on the tracking information, wherein the audit information is generated based on slice information stored in metadata associated with the security token.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
receiving, from a first user associated with an account in a multi-tenant database system, a query;
executing, by at least one hardware processor in the multi-tenant database system, the query to generate query results;
storing the query results in at least one storage device in the multi-tenant database system;
generating a security token associated with the stored query results, the security token including a unique string value;
sharing the security token with a second user;
providing access to the stored query results in the at least one storage device to the second user based on the security token;
tracking access to the stored query results based on usage of the security token to generate tracking information; and
generating audit information of access to the stored query results based on the tracking information, wherein the audit information is generated based on slice information stored in metadata associated with the security token.

2. The method of claim 1, further comprising:
receiving, from the second user, a request to access the stored query results, the request including the security token; and
authenticating the second user as belonging to the account in the multi-tenant database system.

3. The method of claim 1, wherein metadata associated with the security token is stored in a metadata database separate from the stored query results.

4. The method of claim 3, wherein the metadata includes a data persistent object including properties and slices.

5. The method of claim 1, wherein lifecycle of the security token is managed separately from the lifecycle of the stored query results.

6. A machine-storage medium embodying instructions that, when executed by a machine, cause the machine to perform operations comprising:
- receiving, from a first user associated with an account in a multi-tenant database system, a query;
- executing the query to generate query results;
- storing the query results in at least one storage device in the multi-tenant database system;
- generating a security token associated with the stored query results, the security toke n including a unique string value;
- sharing the security token with a second user;
- providing access to the stored query results in the at least one storage device to the second user based on the security token;
- tracking access to the stored query results based on usage of the security token to generate tracking information; and
- generating audit information of access to the stored query results based on the tracking information, wherein the audit information is generated based on slice information stored in metadata associated with the security token.

7. The machine-storage medium of claim 6, further comprising:
- receiving, from the second user, a request to access the stored query results, the request including the security token; and
- authenticating the second user as belonging to the account in the multi-tenant database system.

8. The machine-storage medium of claim 6, wherein metadata associated with the security token is stored in a metadata database separate from the stored query results.

9. The machine-storage medium of claim 8, wherein the metadata includes a data persistent object including properties and slices.

10. The machine-storage medium of claim 6, wherein lifecycle of the security token is managed separately from the lifecycle of the stored query results.

11. A system comprising:
- at least one hardware processor; and
- at least one memory storing instructions that, when executed by the at least one hardware processor, cause the at least one hardware processor to perform operations comprising:
  - receiving, from a first user associated with an account in a multi-tenant database system, a query;
  - executing the query to generate query results;
  - storing the query results in at least one storage device in the multi-tenant database system;
  - generating a security token associated with the stored query results, the security token including a unique string value;
  - sharing the security token with a second user;
  - providing access to the stored query results in the at least one storage device to the second user based on the security token;
  - tracking access to the stored query results based on usage of the security token to generate tracking information; and
- generating audit information of access to the stored query results based on the tracking information, wherein the audit information is generated based on slice information stored in metadata associated with the security token.

12. The system of claim 11, the operations further comprising:
- receiving, from the second user, a request to access the stored query results, the request including the security token; and
- authenticating the second user as belonging to the account in the multi-tenant database system.

13. The system of claim 11, wherein metadata associated with the security token is stored in a metadata database separate from the stored query results.

14. The system of claim 13, wherein the metadata includes a data persistent object including properties and slices.

15. The system of claim 11, wherein lifecycle of the security token is managed separately from the lifecycle of the stored query results.

* * * * *

UNITED STATES PATENT AND TRADEMARK OFFICE
CERTIFICATE OF CORRECTION

| | |
|---|---|
| PATENT NO. | : 11,973,748 B1 |
| APPLICATION NO. | : 18/497232 |
| DATED | : April 30, 2024 |
| INVENTOR(S) | : Carru et al. |

Page 1 of 1

It is certified that error appears in the above-identified patent and that said Letters Patent is hereby corrected as shown below:

In the Claims

In Column 19, Line 10, in Claim 6, delete "toke n" and insert --token-- therefor Signed and Sealed this
Fifteenth Day of July, 2025

Coke Morgan Stewart
*Acting Director of the United States Patent and Trademark Office*